US012266036B2

(12) United States Patent
Wu et al.

(10) Patent No.: US 12,266,036 B2
(45) Date of Patent: Apr. 1, 2025

(54) COMPUTED TOMOGRAPHY SCATTER AND CROSSTALK CORRECTION

(71) Applicant: General Electric Company, Schenectady, NY (US)

(72) Inventors: Mingye Wu, Clifton Park, NY (US); Xin Li, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 401 days.

(21) Appl. No.: 17/684,927

(22) Filed: Mar. 2, 2022

(65) Prior Publication Data

US 2023/0281888 A1 Sep. 7, 2023

(51) Int. Cl.
*G06T 11/00* (2006.01)
*G01N 23/046* (2018.01)
(Continued)

(52) U.S. Cl.
CPC .......... *G06T 11/005* (2013.01); *G01N 23/046* (2013.01); *G01T 7/005* (2013.01);
(Continued)

(58) Field of Classification Search
CPC ... G06T 11/005; G06T 7/0004; G06T 11/006; G06T 2207/10081; G06T 2207/30108;
(Continued)

(56) References Cited

U.S. PATENT DOCUMENTS 6,310,968 B1 * 10/2001 Hawkins ............... G01T 1/1615
250/363.04
8,039,804 B2 10/2011 Brunner
(Continued)

FOREIGN PATENT DOCUMENTS

EP 3265789 1/2018
EP 3350582 7/2018
(Continued)

OTHER PUBLICATIONS

Nuyts, Johan, et al., "Modelling the physics in the iterative reconstruction for transmission computed tomography", IOP Publishing, Physics in Medicine and Biology, Phys. Med. Biol. 58 (2013) R63-R96; doi: 10.1088/0031-9155/58/12R63.
(Continued)

*Primary Examiner* — Nimesh Patel
(74) *Attorney, Agent, or Firm* — Fitch, Even, Tabin & Flannery LLP (57) ABSTRACT

A control circuit accesses a memory having stored therein total detected computed tomography image signal information in a projection domain for an object, a first model representing object scatter, a second model representing background scatter, and a third model representing detector crosstalk. Prior to a reconstruction step, the control circuit processes the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object. The control circuit can then carry out a reconstruction step using the scatter and crosstalk-corrected computed tomography image signal information in the projection domain for the object.

18 Claims, 4 Drawing Sheets

(51) Int. Cl.
 *G01T 7/00* (2006.01)
 *G06T 7/00* (2017.01)
(52) U.S. Cl.
 CPC .......... *G06T 7/0004* (2013.01); *G06T 11/006* (2013.01); *G01N 2223/303* (2013.01); *G06T 2207/10081* (2013.01); *G06T 2207/30108* (2013.01)
(58) Field of Classification Search
 CPC ... G06T 11/003; G06T 7/0012; G06T 11/008; G06T 2207/10072; G06T 2210/41; G06T 2211/416; G06T 7/20; G06T 15/08; G06T 2207/20081; G06T 2207/20084; G06T 2207/30068; G06T 2211/421; G06T 2211/424; G06T 3/40; G06T 5/60; G06T 5/70; G01N 23/046; G01N 2223/303; G01N 2223/419; G01N 2223/612; G01N 2223/401; G01N 23/041; G01N 23/04; G01N 21/4795; G01T 7/005; G01T 1/17; G01T 1/2985; A61B 6/583; A61B 6/032; A61B 6/03; A61B 6/5258; A61B 6/484; A61B 6/037; A61B 3/102; A61B 5/0066; A61B 6/508; A61B 1/00096; A61B 1/00172; A61B 1/05; A61B 3/0008; A61B 3/0083; A61B 3/14; A61B 5/0068; A61B 5/0536; A61B 5/6852; A61B 6/025; A61B 6/4035; A61B 6/482; A61B 6/585; H05G 1/26; G01B 9/02044; G01B 9/02091
 See application file for complete search history.

(56) References Cited

U.S. PATENT DOCUMENTS

| | | | |
|---|---|---|---|
| 8,111,804 | B2 | 2/2012 | Dafni |
| 8,989,469 | B2 | 3/2015 | Fahimian et al. |
| 9,706,972 | B1 * | 7/2017 | Ahn ................. A61B 6/502 |
| 10,098,603 | B2 | 10/2018 | Manak |
| 10,395,353 | B2 | 8/2019 | Rong et al. |
| 10,497,113 | B2 | 12/2019 | Hennix et al. |
| 10,679,385 | B1 * | 6/2020 | Yanoff ................. G01T 1/249 |
| 2005/0201513 | A1 | 9/2005 | Nukui et al. |
| 2016/0063350 | A1 | 3/2016 | Newman |
| 2018/0106734 | A1 | 4/2018 | Lang |
| 2018/0330233 | A1 | 11/2018 | Rui |
| 2018/0336709 | A1 * | 11/2018 | Persson ................. G06T 11/006 |
| 2022/0042932 | A1 * | 2/2022 | Sun ................. G01T 1/2985 |
| 2022/0229196 | A1 * | 7/2022 | Zhan ................. A61B 6/035 |

FOREIGN PATENT DOCUMENTS

| | | |
|---|---|---|
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |
| JP | 2006-239118 A * | 9/2006 |
| JP | 2006239118 | 9/2006 |
| WO | 2009004523 | 1/2009 |

OTHER PUBLICATIONS

Shedlock, et al., "Refinement of Imaging Processing of Scatter Correction and Beam Hardening Tools for Industrial Radiography and Cone Beam CT", Digital Industrial Radiology and Computed Tomography (DIR 2015) Jun. 22-25, 2015, Belgium, Ghent—www.ndt.net/app.DIR2015, 10 pgs, https://www.ndt.net/events/DIR2015/app/content/Paper/82_Shedlock.pdf.

Shedlock, D., Wang, A., Nisius, D., Hu, M., Yoon, S., Brooks, A., Shapiro, E. and Star-Lack, J., 2015. Refinement of imaging processing of scatter correction and beam hardening tools for industrial radiography and cone beam CT. Digital Industrial Radiology and Computed Tomography (Ghent University, Belgium, Jun. 22-25, 2015). https://www.ndt.net/events/DIR2015/app/content/Paper/82_Shedlock.pdf.

* cited by examiner

COMPUTED TOMOGRAPHY SCATTER AND CROSSTALK CORRECTION

TECHNICAL FIELD

These teachings relate generally to computed tomography and more particularly to scatter and crosstalk correction.

BACKGROUND

Industrial computed tomography (CT) scanning generally refers to any computer-aided tomographic process, but often refers more specifically to X-ray computed tomography. X-ray computed tomography employs irradiation to produce three-dimensional internal and external representations of a scanned object. Industrial CT scanning serves in many industries to facilitate the internal inspection of components. Such inspection permits such things as flaw detection, failure analysis, metrology, and assembly analysis.

BRIEF DESCRIPTION OF THE DRAWINGS

Various needs are at least partially met through provision of the method and apparatus for computed tomography scatter and crosstalk correction described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

The quality and accuracy of a given CT image is a function of many variables including the presence of interfering content. Examples of the latter include detector crosstalk, object scatter, and background scatter. The latter typically degrades CT image quality by introducing image artifacts, reducing spatial resolution, and degrading the corresponding signal-to-noise ratio. Prior solutions to removing such interfering content suffer various concerns including the need for costly specially-designed hardware and/or a need for regular supplemental scans. These are all significant challenges.

Generally speaking, the various aspects of the present disclosure can be employed with a control circuit that accesses a memory having stored therein total detected computed tomography image signal information in a projection domain for an object, a first model representing object scatter, a second model representing background scatter, and a third model representing detector crosstalk. Prior to a reconstruction step, the control circuit processes the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object. The control circuit can then carry out a reconstruction step using the scatter and crosstalk-corrected computed tomography image signal information in the projection domain for the object.

By one approach, these teachings provide for accomplishing the foregoing without using a hardware-based scatter profile measurement.

By one approach, these teachings provide for pre-calculating an object scatter database and then generating the aforementioned first model as a function, at least in part, of that object scatter database. By one approach, the foregoing comprises pre-calculating the object scatter database only on a per material/spectrum basis.

By one approach, these teachings provide for calibrating background scatter information to provide calibrated background scatter information and then generating the aforementioned second model as a function, at least in part, of that calibrated background scatter information. By one approach the foregoing comprises calibrating the background scatter information only once on a per scanner basis.

By one approach, these teachings provide for calibrating detector crosstalk information to provide calibrated detector crosstalk information and then generating the aforementioned third model as a function, at least in part, of that calibrated detector crosstalk information. By one approach, the foregoing comprises calibrating the detector crosstalk information only once on a per scanner basis. By one approach, the above-described use of this third model can comprise processing the aforementioned total detected computed tomography image signal information in the projection domain for the object as a function of the third model to compensate for detector crosstalk by using inverse convolution.

So configured, these teachings offer a software-based correction method that utilizes models that handle three major scatter effects in industrial CT systems. These teachings can be applied to the projection data before the reconstruction step. A special model-based approach serves to estimate a corresponding scatter signal that is subtracted from the total detected signal in the projection domain for each of detector cross-talk, object scatter, and background scatter. Although each approach benefits from calibration (using either calibration scans or simulations), such calibration need only occur infrequently and, in many cases, only once on a per material/spectrum and/or per scanner basis.

Those skilled in the art will appreciate that these teachings offer useful and significant correction while avoiding any need to measure scatter for a given workpiece as such. Accordingly, these teachings save time, eliminate hardware costs, and greatly delay or even avoid burn-in or memory affects in the detector.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Figure 1:
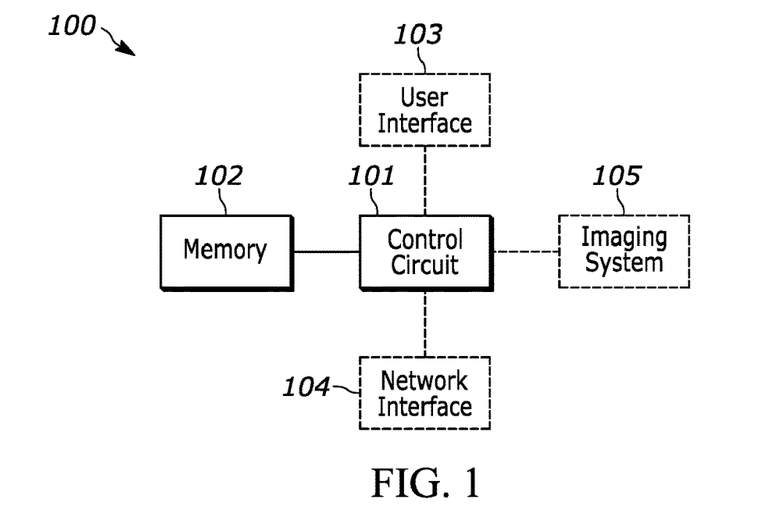
FIG. 1 comprises a block diagram as configured in accordance with various embodiments of these teachings.

The foregoing and other benefits may become clearer upon making a thorough review and study of the following detailed description. Referring now to the drawings, and in particular to FIG. 1, an illustrative apparatus 100 that is compatible with many of these teachings will now be presented.

In this particular example, the enabling apparatus 100 includes a control circuit 101. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

By one optional approach the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to the aforementioned CT image signal information and models, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as a dynamic random access memory (DRAM).)

By one optional approach, the control circuit 101 operably couples to a user interface 103. This user interface 103 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

By another optional approach, in lieu of the foregoing or in combination therewith, the control circuit 101 also operably couples to a network interface 104. So configured the control circuit 101 can communicate with other elements (both within the apparatus 100 and external thereto) via the network interface 104. Network interfaces, including both wireless and non-wireless platforms, are well understood in the art and require no particular elaboration here.

And by yet another optional approach, and again in lieu of the foregoing or in combination therewith, the control circuit 101 can operably couple to an imaging system 105 (in particular, a computed tomography imaging system having, for example, a radiation source and one or more detectors).

Figure 2:
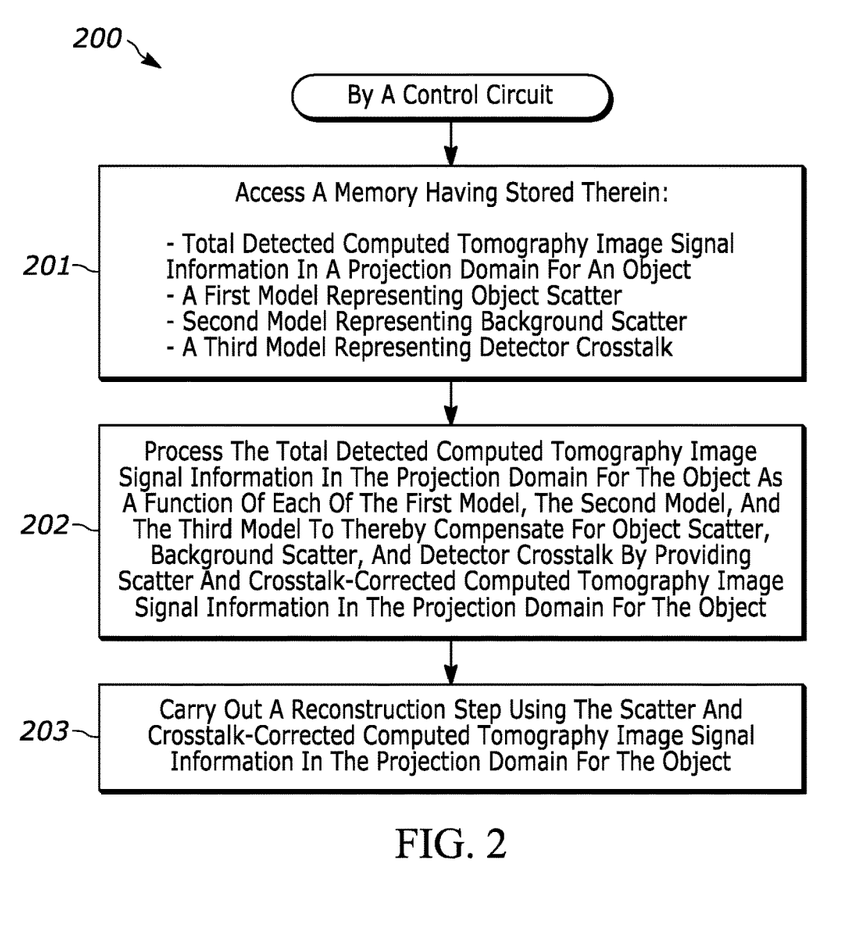
FIG. 2 comprises a flow view as configured in accordance with various embodiments of these teachings.

Referring to FIG. 2, a process 200 that can be carried out via, for example, the above-described control circuit 101 and apparatus 100 will be described.

At block 201, the control circuit 101 accesses the aforementioned memory 102. In particular, the control circuit 101 accesses a number of things that are stored in that memory 102.

The accessed stored items include total detected computed tomography image signal information in a projection domain for an object. The latter information can accord with ordinary prior art practice. The object itself can comprise, for example, a workpiece or other item that is undergoing examination to assess, for example, it's physical integrity. The foregoing information may be obtained, for example, from the above-described imaging system 105.

Figure 3:
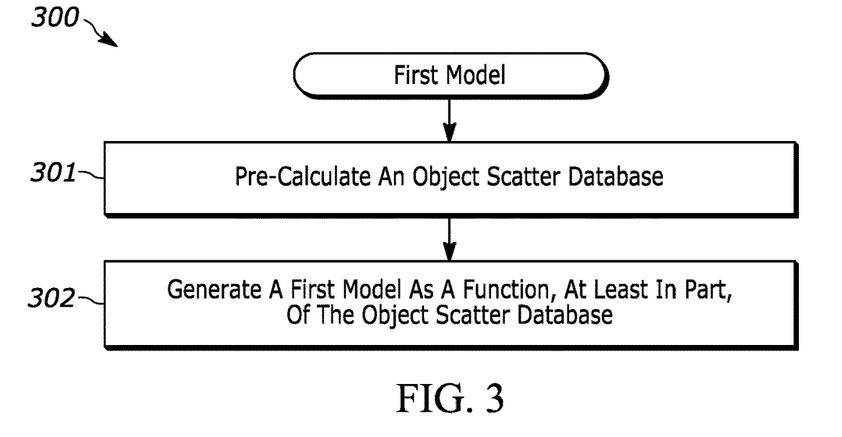
FIG. 3 comprises a flow view as configured in accordance with various embodiments of these teachings.

The accessed stored items also include a first model representing object scatter. Referring momentarily to FIG. 3, these teachings will accommodate a process 300 that provides, at block 301, for pre-calculating an object scatter database and then, at block 302, generating the first model as a function, at least in part, of that object scatter database. By one approach, these teachings will accommodate only pre-calculating that object scatter database on a per material/ spectrum basis. For example, an object scatter database pertaining to the material tungsten need only be pre-calculated once and an object scatter database pertaining to the material stainless steel also need only be pre-calculated once.

By one approach, this first model can comprise a kernel-based model that is pre-trained using Monte Carlo simulation. In a typical application setting the X-ray beam comprises a cone-shaped beam. As used herein, beam i is the i-th sample of the beam and approximates a pencil beam. It could be the beam at pixel i or the beam of a small group of pixels (such as 2×2 pixels or 3×3 pixels). In the present illustrative example, for each beam i:

$$kernel_{sc,i} = func(prep_i)$$

$$SPR = func(prep_i)$$

$$I_{sc,i} = conv2D(I_{0,i} \cdot SPR, kernel_{sc,i})$$

such that total scatter and correction can be represented by:

$$I_{cor} = I_0 - \sum_i I_{sc,i}$$

where I is the detected projection (which represents the intensity of the X-ray that passes through the object—in practice, this corresponds to the detected signal of the detector array, which is proportional to X-ray intensity), prep is the attenuation (prep=$-\log(I_{obj}/I_{air})$), SPR is Scatter-to-Primary-ratio, $I_{obj}$ is the object projection, $I_{air}$ is the airscan, prep reflects the thickness of the object, i is the beam index, $I_{sc}$ is the estimated scatter distribution of pixel i, $I_{cor}$ is the corrected projection, and $I_0$ is the projection before correction. (In the foregoing, airscan refers to detection without the object, where air is the only X-ray absorber, corrected projection refers to the projection after scatter correction, projection before correction refers to the projection before scatter correction, and beam i refers to the i-th beam sample of the whole X-ray beam.)

Figure 4:
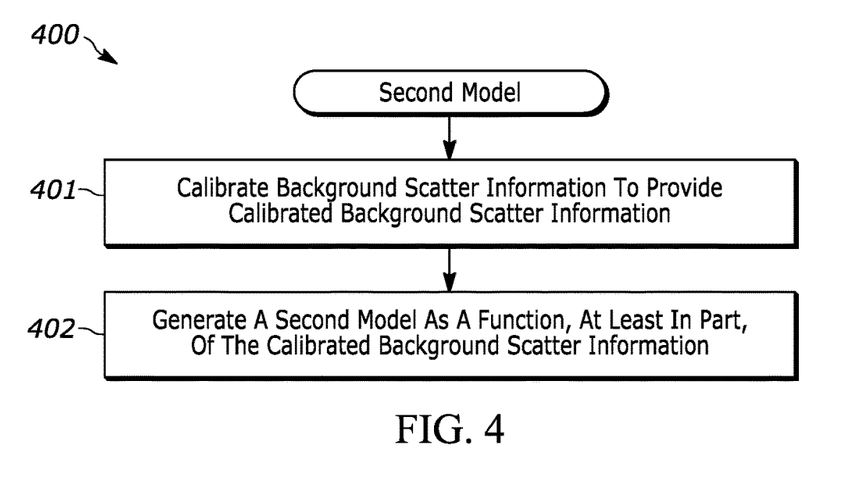
FIG. 4 comprises a flow view as configured in accordance with various embodiments of these teachings.

Referring again to FIG. 2, the accessed stored items further include a second model representing background scatter (which may include off-focal-radiation). Referring momentarily to FIG. 4, these teachings will accommodate a process 400 that provides, at block 401, for calibrating background scatter information to provide corresponding calibrated background scatter information and then, at block 402, generating the second model as a function, at least in part, of that calibrated background scatter information. By one approach, these teachings will accommodate only calibrating that background scatter information once on a per scanner basis. Using that approach, the scanner that comprises a part of the utilized imaging system 105 need only be calibrated once as an initial step and need not be calibrated again for the purposes of these teachings.

By one approach this second model comprises an analytical model that is calibrated using wire or edge measurements where $kernel_{bsc}$ is determined. For example:

$$trans_{prim} = \frac{I_{prim}}{I_{air}}$$

$$trans_{bsc} = conv2D(trans_{prim}, kernel_{bsc})$$

$$I_{bsc} = I_{bsc,air} \cdot trans_{bsc}$$

-continued
$$I_{cor} = I_0 - I_{bsc}$$

where I is the detected projection (which represents the intensity of the X-ray), Prim refers to the primary beam, Trans refers to transmittance, Air is airscan, Bsc is background scatter, $I_{cor}$ is the corrected projection, and $I_0$ is the projection before correction.

Figure 5:
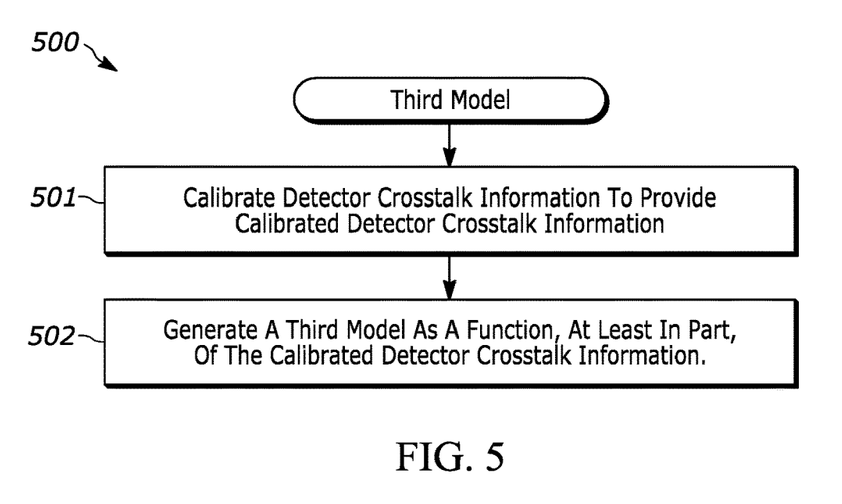
FIG. 5 comprises a flow view as configured in accordance with various embodiments of these teachings.

Referring again to FIG. 2, the accessed stored items further include a third model representing detector crosstalk. Referring momentarily to FIG. 5, these teachings will accommodate a process 500 that provides, at block 501, for calibrating detector crosstalk information to provide corresponding calibrated detector crosstalk information, and then, at block 502, generating the third model as a function, at least in part, of the calibrated detector crosstalk information. By one approach, and as with the second model described above, these teachings will accommodate only calibrating that detector crosstalk information once on a per scanner basis.

By one approach, this third model comprises an analytical model that is calibrated using corresponding measurements. An illustrative example in these regards will be provided with momentary reference to FIG. 6. It will be understood that this example is intended to serve in an illustrative capacity and that no particular limitations with respect to these teachings are intended by way of the specificity of this example.

Figure 6:
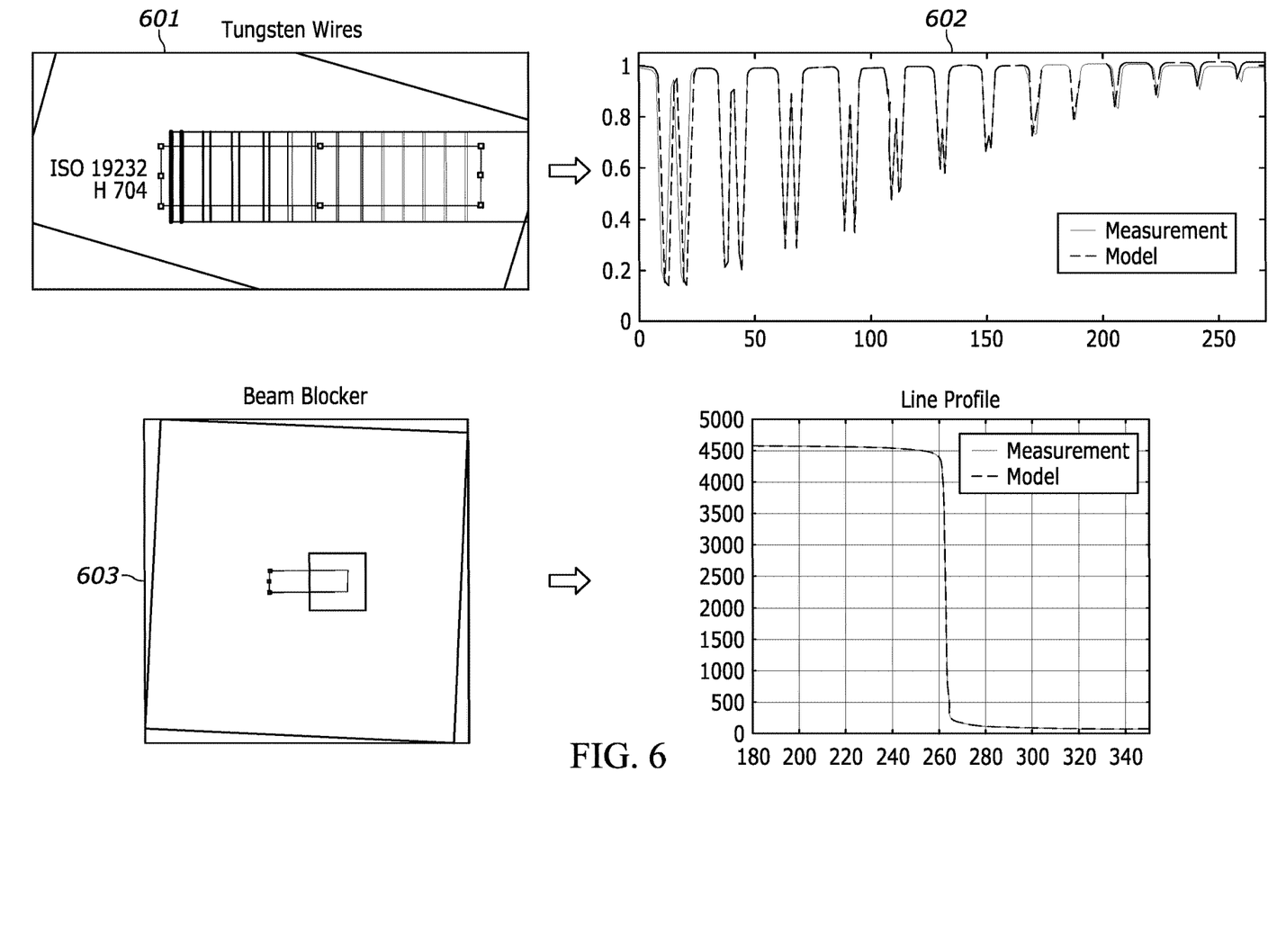
FIG. 6 comprises a detector cross-talk calibration view as configured in accordance with various embodiments of these teachings.

Detector cross-talk calibration can include placement of high attenuation edges or wires (such as tungsten wires 601) on the detector surface. The edge image or profile 602 will be blurred due to cross-talk. A convolution model can be used to fit the blurring, where the kernel is optimized via the correction calculation $I_{cor}$=DeConv($I_0$,kernel). (DeConv refers to deconvolution, and represents the inverse of $I_{cor}$*kernel=$I_o$, where * is convolution.)

In lieu of the foregoing, or in combination therewith, these teachings will also accommodate similarly using the profile at the edge of a blocker 603 to measure crosstalk point spread function or kernel, which profile can be matched with the corresponding model.

Referring again to FIG. 2, at block 202 the control circuit 101 then processes the aforementioned total detected computed tomography image signal information in the projection domain for the object as a function of each of the first model, the second model, and the third model to thereby compensate for object scatter, background scatter, and detector crosstalk (respectively) to thereby provide scatter and crosstalk-corrected computed tomography image signal information in the projection domain for that object. (Computed tomography data has two domains, projection and image. Here, projection is the detection of each view and image comprises tomographic images generated by the reconstruction from the projections. When the correction method works on the projection, it is a "projection domain correction." Similarly, if the correction method works on the reconstructed image, it would be an "image domain correction.") By one approach, and as one illustrative example in these regards, the foregoing can include processing the total detected computed tomography image signal information in the projection domain for the object as a function of the third model to compensate for detector crosstalk by using inverse convolution.

By one approach, and as shown in FIG. 2, the aforementioned processing activity occurs prior to any reconstruction step. It will also be appreciated that the described processing activity can be carried out without using a hardware-based scatter profile measurement.

As an optional but likely typical follow-on step, and as illustrated at block 203, this process 200 can then subsequently provide for carrying out a reconstruction step using the scatter and crosstalk-corrected computed tomography in the projection domain for the object. Image reconstruction in computed tomography constitutes a mathematical process that generates tomographic images from X-ray projection data acquired at many different angles around the object.

Figure 7:
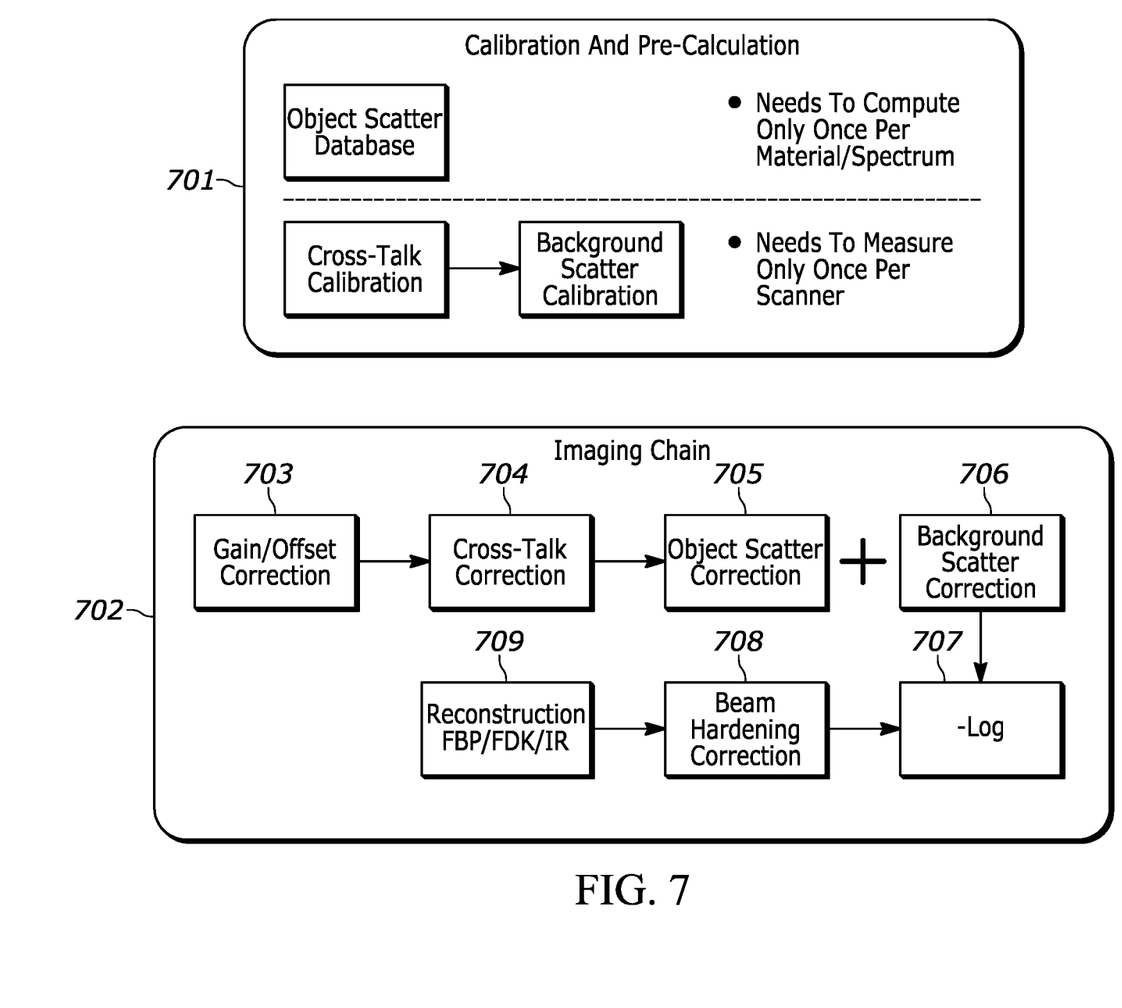
FIG. 7 comprises a block diagram view as configured in accordance with various embodiments of these teachings.

FIG. 7 provides an illustrative example of these teaching in a particular application setting. Block 701 illustrates the various calibration and pre-calculation activities presumed by these teachings.

Block 702, in turn, presents an illustrative imaging chain. Generally speaking, the output of one correction is the input for the next correction. In this particular example, following a gain/offset correction step 703, this imaging chain first utilizes the aforementioned third model to effect cross-talk correction at block 704, followed by use of the aforementioned first model to effect object scatter correction at block 705, followed at block 706 by use of the aforementioned second model to effect background scatter correction. The resultant corrected information is then processed as a function of an inverse log step 707 followed by beam hardening correction at block 708 and then reconstruction at block 709. While the order in which the aforementioned models are applied can vary with the needs and or opportunities represented by a given application setting, the above-described order in this imaging chain will likely prove beneficial in many application settings.

These teachings resolve many image quality problems due to scatter and crosstalk while avoiding the need for specific scatter measurements and without an ongoing need for extra or specialized hardware. These teachings accordingly provide quality results at a reduced cost due at least in part to avoiding the time required to provide additional scans and without contributing to decreased detector life by avoiding hardware-based methods that can result in burn-in patterns.

Further aspects of the disclosure are provided by the subject matter of the following clauses:

1. A method comprising:
by a control circuit:
accessing a memory having stored therein:
total detected computed tomography image signal information in a projection domain for an object;
a first model representing object scatter;
a second model representing background scatter; and
a third model representing detector crosstalk; and
prior to a reconstruction step, processing the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object.

2. The method of clause 1 further comprising:
carrying out a reconstruction step using the scatter and crosstalk-corrected computed tomography image signal information in the projection domain for the object.

3. The method of clause 1 wherein providing the scatter and crosstalk-corrected computed tomography image signal information in the projection domain for the object comprises providing the scatter and crosstalk-corrected computed tomography image signal information in the projection domain for the object without using a hardware-based scatter profile measurement.

4. The method of clause 1 further comprising:
pre-calculating an object scatter database;
generating the first model as a function, at least in part, of the object scatter database.

5. The method of clause 4 wherein pre-calculating the object scatter database comprises pre-calculating the object scatter database only on a per material/spectrum basis.

6. The method of clause 1 further comprising:
calibrating background scatter information to provide calibrated background scatter information;
generating the second model as a function, at least in part, of the calibrated background scatter information.

7. The method of clause 6 wherein calibrating the background scatter information comprises calibrating the background scatter information only once on a per scanner basis.

8. The method of clause 1 further comprising:
calibrating detector crosstalk information to provide calibrated detector crosstalk information;
generating the third model as a function, at least in part, of the calibrated detector crosstalk information.

9. The method of clause 8 wherein calibrating the detector crosstalk information comprises calibrating the detector crosstalk information only once on a per scanner basis.

10. The method of clause 1 wherein processing the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object comprises, at least in part, processing the total detected computed tomography image signal information in the projection domain for the object as a function of the third model to compensate for detector crosstalk by using inverse convolution.

11. An apparatus comprising:
a memory having stored therein:
total detected computed tomography image signal information in a projection domain for an object;
a first model representing object scatter;
a second model representing background scatter; and
a third model representing detector crosstalk; and
a control circuit operably coupled to the memory and configured to, prior to a reconstruction step, process the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object.

12. The apparatus of clause 11 wherein the control circuit is further configured to:
carry out a reconstruction step using the scatter and crosstalk-corrected computed tomography image signal information in the projection domain for the object.

13. The apparatus of clause 11 wherein the control circuit is further configured to provide the scatter and crosstalk-corrected computed tomography image signal information in the projection domain for the object by providing the scatter and crosstalk-corrected computed tomography image signal information in the projection domain for the object without using a hardware-based scatter profile measurement.

14. The apparatus of clause 11 wherein the control circuit is further configured to:
pre-calculate an object scatter database;
generate the first model as a function, at least in part, of the object scatter database.

15. The apparatus of clause 14 wherein the control circuit is further configured to pre-calculate the object scatter database by pre-calculating the object scatter database only on a per material/spectrum basis.

16. The apparatus of clause 11 wherein the control circuit is further configured to:
calibrate background scatter information to provide calibrated background scatter information;
generate the second model as a function, at least in part, of the calibrated background scatter information.

17. The apparatus of clause 16 wherein the control circuit is further configured to calibrate the background scatter information by calibrating the background scatter information only once on a per scanner basis.

18. The apparatus of clause 11 wherein the control circuit is further configured to:
calibrate detector crosstalk information to provide calibrated detector crosstalk information;
generate the third model as a function, at least in part, of the calibrated detector crosstalk information.

19. The apparatus of clause 18 wherein the control circuit is further configured to calibrate the detector crosstalk information by calibrating the detector crosstalk information only once on a per scanner basis.

20. The apparatus of clause 11 wherein the control circuit is further configured to process the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object by, at least in part, processing the total detected computed tomography image signal information in the projection domain for the object as a function of the third model to compensate for detector crosstalk by using inverse convolution.

Those skilled in the art will recognize that a wide variety of modifications, alterations, and combinations can be made with respect to the above-described embodiments without departing from the scope of the disclosure, and that such modifications, alterations, and combinations are to be viewed as being within the ambit of the inventive concept.

What is claimed is:

1. A method comprising:
by a control circuit:
calibrating detector crosstalk information to provide calibrated detector crosstalk information;
accessing a memory having stored therein:
total detected computed tomography image signal information in a projection domain for an object;
a first model representing object scatter;
a second model representing background scatter, wherein the second model is separate and distinct from the first model; and
a third model representing detector crosstalk, wherein the third model is generated as a function, at least in part, of the calibrated detector crosstalk information; and prior to a reconstruction step, processing the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object.

2. The method of claim 1 further comprising:
carrying out a reconstruction step using the scatter and crosstalk-corrected computed tomography image signal information in the projection domain for the object.

3. The method of claim 1 wherein providing the scatter and crosstalk-corrected computed tomography image signal information in the projection domain for the object comprises providing the scatter and crosstalk-corrected computed tomography image signal information in the projection domain for the object without using a hardware-based scatter profile measurement.

4. The method of claim 1 further comprising:
pre-calculating an object scatter database; and
generating the first model as a function, at least in part, of the object scatter database.

5. The method of claim 4 wherein pre-calculating the object scatter database comprises pre-calculating the object scatter database only on a per material/spectrum basis.

6. The method of claim 1 further comprising:
calibrating background scatter information to provide calibrated background scatter information; and
generating the second model as a function, at least in part, of the calibrated background scatter information.

7. The method of claim 6 wherein calibrating the background scatter information comprises calibrating the background scatter information only once on a per scanner basis.

8. The method of claim 1 wherein calibrating the detector crosstalk information comprises calibrating the detector crosstalk information only once on a per scanner basis.

9. The method of claim 1 wherein processing the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object comprises, at least in part, processing the total detected computed tomography image signal information in the projection domain for the object as a function of the third model to compensate for detector crosstalk by using inverse convolution.

10. An apparatus comprising:
a memory having stored therein:
total detected computed tomography image signal information in a projection domain for an object;
a first model representing object scatter;
a second model representing background scatter, wherein the second model is separate and distinct from the first model; and
a third model representing detector crosstalk; and
a control circuit operably coupled to the memory and configured to, prior to a reconstruction step:
calibrate detector crosstalk information to provide calibrated detector crosstalk information;
generate the third model as a function, at least in part, of the calibrated detector crosstalk information;
process the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object.

11. The apparatus of claim 10 wherein the control circuit is further configured to:
carry out a reconstruction step using the scatter and crosstalk-corrected computed tomography image signal information in the projection domain for the object.

12. The apparatus of claim 10 wherein the control circuit is further configured to provide the scatter and crosstalk-corrected computed tomography image signal information in the projection domain for the object by providing the scatter and crosstalk-corrected computed tomography image signal information in the projection domain for the object without using a hardware-based scatter profile measurement.

13. The apparatus of claim 10 wherein the control circuit is further configured to:
pre-calculate an object scatter database; and
generate the first model as a function, at least in part, of the object scatter database.

14. The apparatus of claim 13 wherein the control circuit is further configured to pre-calculate the object scatter database by pre-calculating the object scatter database only on a per material/spectrum basis.

15. The apparatus of claim 10 wherein the control circuit is further configured to:
calibrate background scatter information to provide calibrated background scatter information; and
generate the second model as a function, at least in part, of the calibrated background scatter information.

16. The apparatus of claim 15 wherein the control circuit is further configured to calibrate the background scatter information by calibrating the background scatter information only once on a per scanner basis.

17. The apparatus of claim 10 wherein the control circuit is further configured to calibrate the detector crosstalk information by calibrating the detector crosstalk information only once on a per scanner basis.

18. The apparatus of claim 10 wherein the control circuit is further configured to process the total detected computed tomography image signal information in the projection domain for the object as a function of each of the first model, the second model, and the third model to thereby compensate for object scatter, background scatter, and detector crosstalk by providing scatter and crosstalk-corrected computed tomography image signal information in the projection domain for the object by, at least in part, processing the total detected computed tomography image signal information in the projection domain for the object as a function of the third model to compensate for detector crosstalk by using inverse convolution.

* * * * *